(12) United States Patent
Kumar et al.

(10) Patent No.: US 6,308,227 B1
(45) Date of Patent: Oct. 23, 2001

(54) SYSTEM FOR DETECTING A WIRELESS PERIPHERAL DEVICE BY A HOST COMPUTER TRANSMITTING A HAIL MESSAGE INCLUDING A PERSISTENT HOST IDENTIFIER AND A HOST ADDRESS GENERATED

(75) Inventors: Mohan J. Kumar, Beaverton; Rajiv Choudhary, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/103,764

(22) Filed: Jun. 24, 1998

(51) Int. Cl.[7] ....................................... G06F 13/14
(52) U.S. Cl. .................. 710/4; 710/3; 710/8; 710/9; 710/105; 710/106; 709/227; 709/228
(58) Field of Search ..................... 709/222, 227, 709/228; 710/3, 4, 9, 8, 10, 105, 106; 713/1; 340/3.51–3.54, 825.52, 825.53

(56) References Cited

U.S. PATENT DOCUMENTS

| | | | |
|---|---|---|---|
| 4,586,134 | * 4/1986 | Norstedt | 709/228 |
| 5,317,693 | * 5/1994 | Cuenod et al. | 710/9 |
| 5,687,320 | * 11/1997 | Wiley et al. | 709/245 |
| 5,877,745 | * 3/1999 | Beeteson et al. | 345/156 |
| 6,088,730 | * 7/2000 | Kato et al. | 709/227 |
| 6,195,712 | * 2/2001 | Pawlowski et al. | 710/19 |

OTHER PUBLICATIONS

Infrared Bus (irBus) Specification IrDA CIR (Control IR) Standard, Final Revision 1.0d, Feb. 25, 1998.*
Infrared Bus (IrBus) Specification *IrDA CIR* (Control IR) *Standard,* Final Revision 1.0d, Feb. 25, 1998; Copyright 1997, 1998, HP Intel, Microsoft, Sharp.

* cited by examiner

*Primary Examiner*—Thomas Lee
*Assistant Examiner*—Ilwoo Park
(74) *Attorney, Agent, or Firm*—Trop, Pruner & Hu, P.C.

(57) ABSTRACT

A persistent host identifier value is used during the automatic detection (e.g., enumeration) of a wireless peripheral device by a host computer system following a power-up or reset operation of the host. Use of the persistent host identifier may allow the rapid establishment of a communication channel between the host computer system and wireless peripheral device. Once a wireless peripheral device has been enumerated, an identifier value associated with the peripheral device may also be retained, and used, during subsequent enumeration and/or binding operations.

26 Claims, 6 Drawing Sheets

SYSTEM FOR DETECTING A WIRELESS PERIPHERAL DEVICE BY A HOST COMPUTER TRANSMITTING A HAIL MESSAGE INCLUDING A PERSISTENT HOST IDENTIFIER AND A HOST ADDRESS GENERATED

BACKGROUND

The invention relates generally to the use of wireless peripheral devices with a host computing system.

Peripheral devices such as keyboards, joysticks, and mice have traditionally been connected to a host computer system by communication cables. Data transfer between such "tethered" peripherals and a host computer system have been via these cables. Recently, the use of wireless peripheral devices has emerging. These new peripheral devices may communicate with their host computer system through, e.g., high frequency (HF), radio frequency (RF), or infrared (IR) communication signals.

Before a wireless peripheral device can communicate with a host computer system, a communication channel between the two must be established. Establishment of a communication channel typically requires the host to detect the presence of the peripheral device, and then to exchange identifiers so that the computer system and device may uniquely identify one another for data transfer operations. Wireless devices currently available require users to manually identify untethered devices to a computer system before they may be used. Thus, it would be beneficial to provide an automated and dynamic technique to identify wireless peripherals, and to associate those peripherals with unique identifiers, so that they could establish communication with a host computer system.

SUMMARY

In one embodiment, the invention provides a method to detect a wireless peripheral device by a host computer system and may include the steps of retrieving a persistent host identifier, transmitting a message that includes the host identifier to the wireless peripheral device, and receiving a response message from the wireless peripheral device. The persistent host identifier may be stored in a persistent memory such as, for example, nonvolatile random access memory. Transmitting a message may comprise generating an electromagnetic signal (e.g., high frequency, radio frequency, or infrared) representative of the message. The method may further include retrieving a wireless peripheral device identifier, and including it in the transmitted message. The method may further include generating a host address prior to transmitting the message, and including the generated host address in the hail message.

In another embodiment, the invention provides a method to automatically detect and bind a wireless peripheral device by a host computer system including generating a host address, retrieving a persistent host identifier, retrieving a persistent wireless peripheral device identifier, transmitting a first message to the wireless peripheral device that incorporates the host identifier, the host address, and the wireless peripheral device identifier, receiving a response message from the wireless peripheral device, and transmitting a second message to the wireless peripheral device that includes the peripheral device address.

Methods in accordance with the various embodiments of the invention may be implemented by computer readable instructions stored in any media that is readable and executable by a computer system.

DETAILED DESCRIPTION

Embodiments of the present invention provide a mechanism to automatically establish a communication link between a host computer system and a wireless peripheral device without user intervention following host power-cycle events (e.g., transition from a power-on condition to a power-off condition to a power-on condition) which uses a host identifier that may be retained across power-cycle and reset operations (i.e., is persistent). This inventive concept may be used with a variety of wireless peripheral device technologies such as high frequency (HF), radio frequency (RF), and infrared (IR) peripherals. The following descriptions are illustrative only and are not to be considered limiting in any respect.

Figure 1:
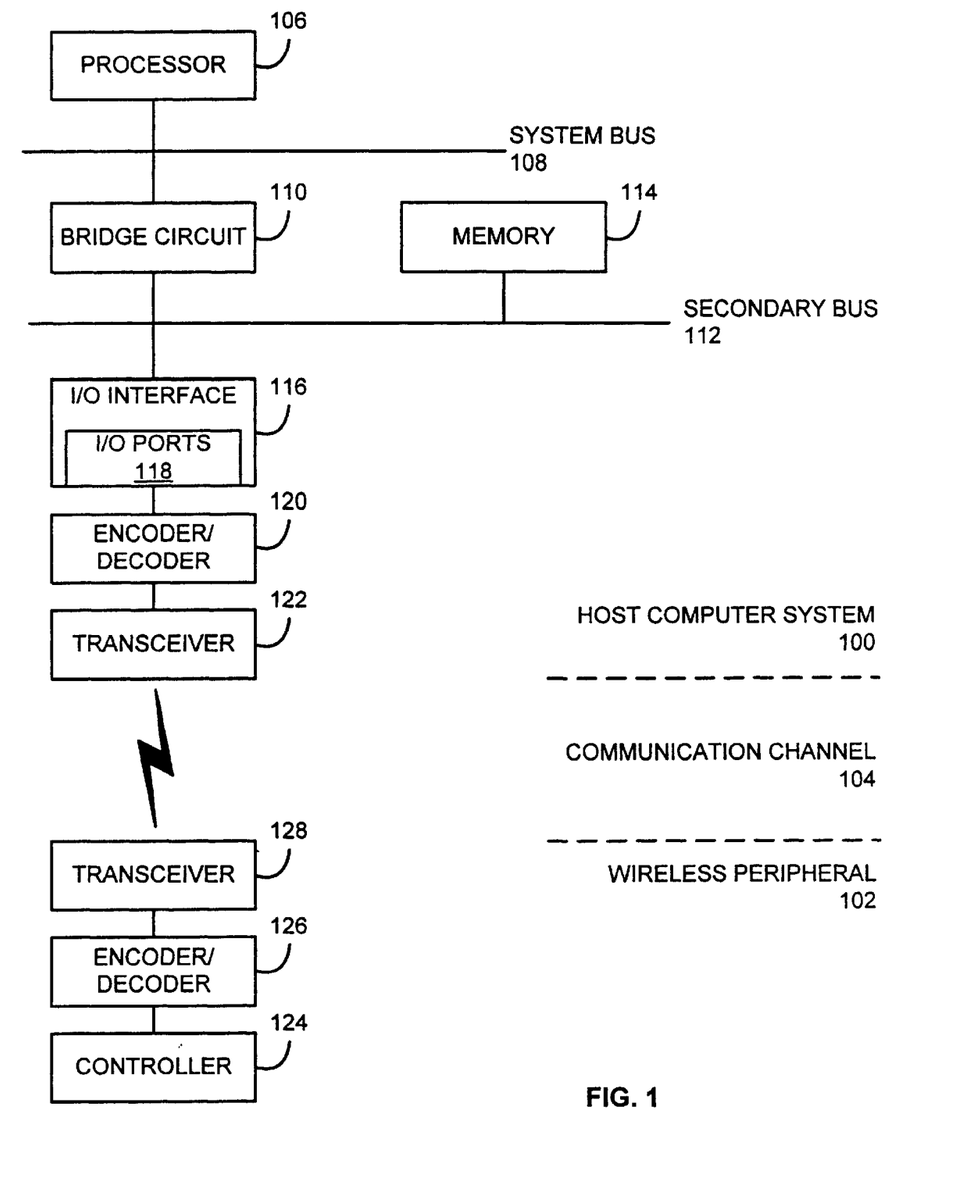
FIG. 1 shows a computer system and wireless peripheral in accordance with one embodiment of the invention.

FIG. 1 shows host computer system 100 coupled to wireless peripheral device 102 though communication channel 104 in accordance with one embodiment of the invention. Computer system 100 includes processor 106 coupled to system bus 108 and, through bridge circuit 110, to secondary bus 112 and memory 114.

Computer system 100 may be a personal computer (PC), a high density television (HDTV) system, or a computer controlled home appliance. Illustrative wireless peripheral devices (e.g., 102) include wireless keyboards, wireless mice (or other wireless pointing devices), wireless control consoles, wireless game-pads, and wireless joysticks. Representative processors (e.g., 106) include the PENTIUM® family of processors and the 80X86 families of processors from Intel Corporation. Illustrative bridge circuits (e.g., 110) include the 82443LX PCI-to-AGP and 82371AB PCI-to-ISA/IDE controllers made by Intel Corporation. System bus 108 may, for example, be an Intel PENTIUM® PRO bus. (See the "Pentium Pro Processor Specification," update release May 1998.) Illustrative secondary buses (e.g., 112) include the universal serial bus and peripheral component interface buses. (See the "Universal Serial Bus (USB) Specification," revision 1.0, January 1996; and the "Peripheral Component Interface (PCI) Specification," revision 2.1S.) Memory 114 may include read only memory (ROM), random access memory (RAM), semiconductor memory devices such as EPROM, EEPROM, and flash devices (collectively nonvolatile RAM or NVRAM), magnetic disks (fixed, floppy, and removable), other magnetic media such as tape, optical media such as CD-ROM disks, or combinations of these memories. For illustrative purposes, host computer system 100 and wireless peripheral device 102 communicate via infrared signals over communication channel 104 in accordance with the "Infrared Bus (IrBus) Specification," version 1.0d, February 1998.

Within computer system 100, communication channel 104 is controlled by input-output (I/O) interface 116. I/O interface 116 includes I/O ports 118 through which communication signals to and from individual wireless peripheral devices pass (only one such peripheral device is shown in FIG. 1). Information being sent from computer system 100 to peripheral device 102 passes through I/O interface 116, is encoded by encoder/decoder 120, and injected into communication channel 104 by transceiver 122. Information being received by computer system 100 from peripheral device 102 is received by transceiver 122, decoded by encoder/decoder 120, passed through I/O interface 116 and routed to processor 106 via bridge circuit 110.

Within peripheral device 102, controller 124 controls communication to and from computer system 100. As in computer system 100, encoder/decoder 126 encodes and decodes information and transceiver 128 transmits and receives signals to/from computer system 100 by way of communication channel 104.

Before wireless peripheral device 102 may be used in conjunction with computer system 100, a communication link must be established between them. Establishment of this link may be done in two phases. In a first phase (hereinafter referred to as enumeration), host computer system 100 discovers or detects the presence of peripheral device 102 and the two exchange address and identification information. In a second phase (hereinafter referred to as binding), an enumerated peripheral is assigned a transiently unique identifier by the host and added to its (the host's) communication allocation cycle (e.g., polling cycle). Once bound, a host and wireless peripheral device may periodically communicate using the peripheral's host-assigned identifier.

Host 100 may, at any given time, have communication links established with a plurality of wireless peripheral devices. That is, host computer system 100 may be simultaneously bound to a number of wireless peripheral devices, the maximum number being equal to the number of wireless peripheral ports 118 host 100 is configured to support. This, and the fact that communication between host 100 and peripheral device 102 occurs via electromagnetic waves transmitted through air rather than through physical cables, and because there may be other hosts and wireless peripherals operating (e.g., transmitting and receiving) within the signal detection range of host 100 and peripheral device 102 (e.g., their operating environment), host 100 and peripheral device 102 may use enumeration and binding mechanisms to uniquely identify themselves to one another.

Figure 2:
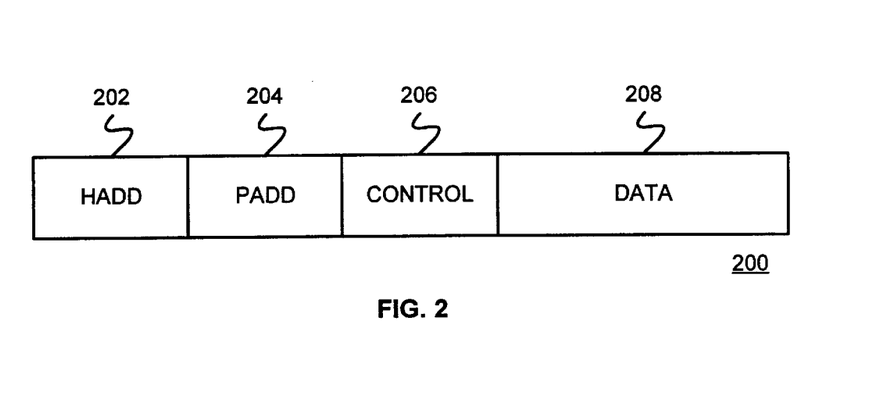
FIG. 2 shows a message data structure in accordance with one embodiment of the invention.

Communication between host 100 and peripheral device 102 may be mediated by a message data structure as shown in FIG. 2. Message data structure 200 may include host address (HADD) field 202, peripheral address (PADD) field 204, control field 206, and data field 208. In one embodiment, designed in accordance with the IrBus specification (see reference above), these fields have the following characteristics. HADD field 202 is an 8-bit host address field which is generated each time host 100 is power-cycled and/or reset. The HADD value identifies host 100 in all subsequent communications between itself and its wireless peripherals. PADD field 204 is a 4-bit peripheral address field which is generated and assigned to peripheral device 102 during the enumeration process by host 100. Once generated, the PADD value identifies peripheral device 102 in all subsequent communications between itself and its host. Control field 206 is a 4-bit field that identifies the type of message being transmitted (e.g., a message from host 100 to peripheral device 102) and thus the nature of the information included in the message's data field 208. Data field 208 is a variable length field (e.g., zero to 97 bytes) that carries the data being transferred between host 100 and peripheral device 102.

Figure 3:
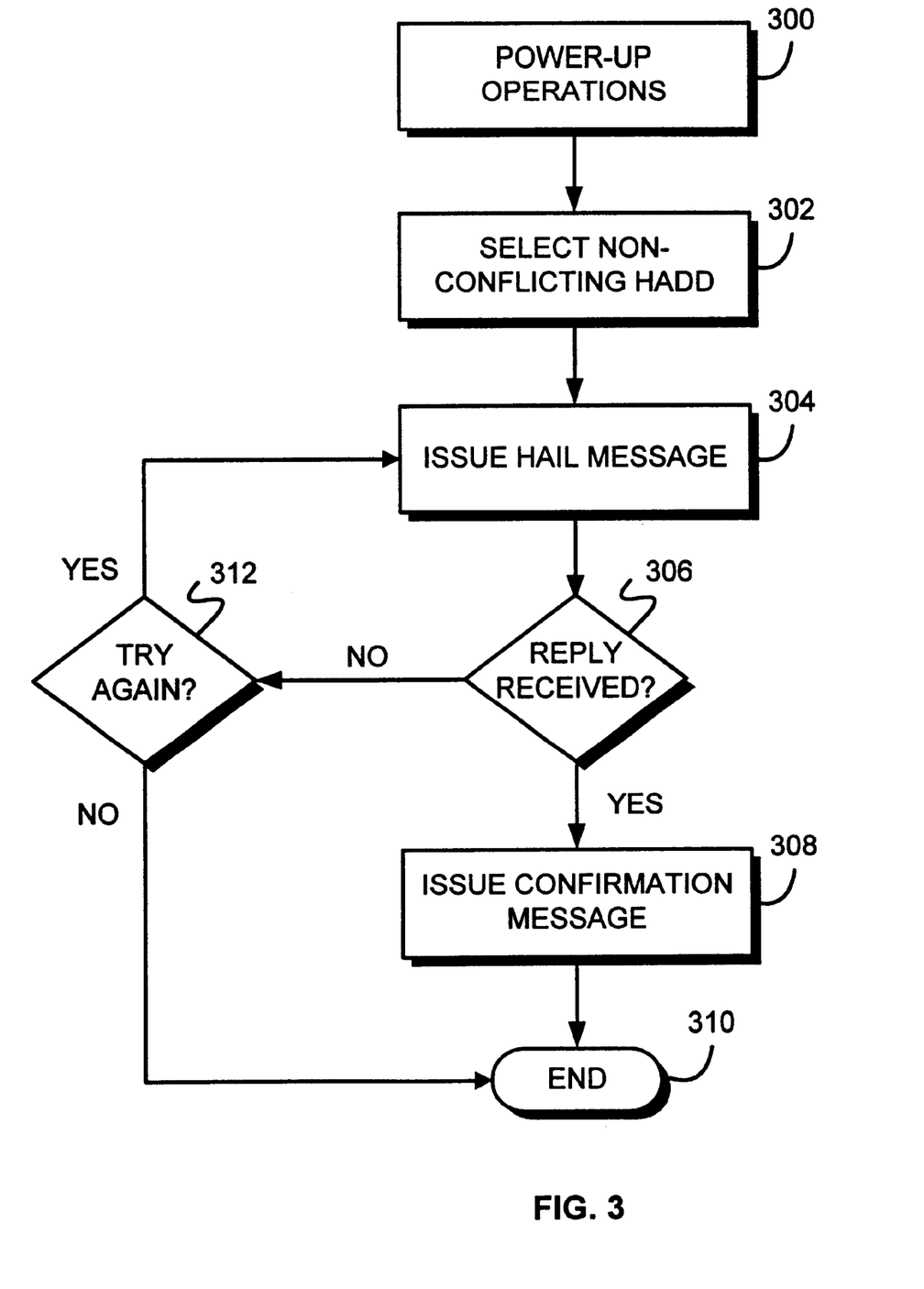
FIG. 3 shows an enumeration process in accordance with one embodiment of the invention.

An enumeration process performed by host 100 in accordance with one embodiment of the invention is shown in FIG. 3. At some initial time, host 100 begins power-up or reset operations during which it determines its HostID value (step 300). For example, host 100 may store its HostID value in memory 114 so that, during start up, this value may be retrieved. In this sense, the HostID value is persistent in that its value is retained from reset/power-cycle operation to reset/power-cycle operation. Next, host 100 generates a HADD value that is distinct from those used by other hosts transmitting within its signal reception area, i.e., it operating environment (step 302). To determine what HADDs are in use, host 100 may listen (via transceiver 122 and encoder/decoder 120) for messages being transmitted to and from other host computer systems within its signal reception area. Once host 100 has determined its HostID and HADD values, it generates a hail message (also referred to as a broadcast message) indicating it is ready to communicate with wireless peripherals (step 304). In a hail type message, data field 208 may be set to include the host's HostID value.

If a wireless peripheral responds to the host's hail message (the 'yes' prong of step 306), host 100 transmits a message to the replying peripheral confirming that it is now enumerated (step 308). On completion of step 308, enumeration processing terminates (step 310). If no wireless peripheral responds to the host's hail message within a specified time period (the 'no' prong of step 306), host 100 may either issue another hail message (the 'yes' prong of step 312) or terminate enumeration processing (the 'no' prong of step 312).

Figure 4:
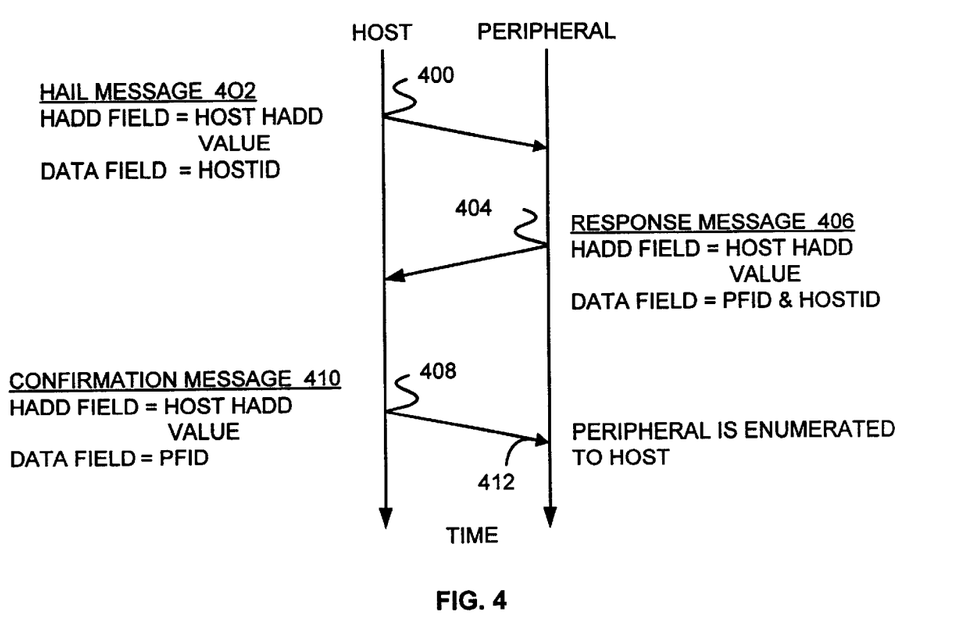
FIG. 4 shows the enumeration process of FIG. 3 in terms of the messages that may be transferred between a host computer system and a wireless peripheral.

FIG. 4 shows the messages that may be transferred between host 100 and peripheral device 102 during the enumeration process of FIG. 3. At time 400 host 100 transmits hail message 402 whose HADD field 202 is set to the host's HADD value and whose data field 208 is set to include its HostID value. At subsequent time 404, peripheral device 102 responds by transmitting response message 406 whose data field 208 is set to include the peripheral's PFID and host's HostID values. In one embodiment, host 100 may store the peripheral device's PFID in a nonvolatile memory 114. (Thus, the peripheral device's PFID value may be made persistent in the same manner as the HostID value.) At time 408, host 100 transmits confirmation message 410 whose HADD field 202 is set to the host's HADD value and whose data field 208 is set to include the peripheral's PFID value. When peripheral device 102 receives confirmation message 410 at time 412, peripheral device 102 is said to be enumerated.

Figure 5:
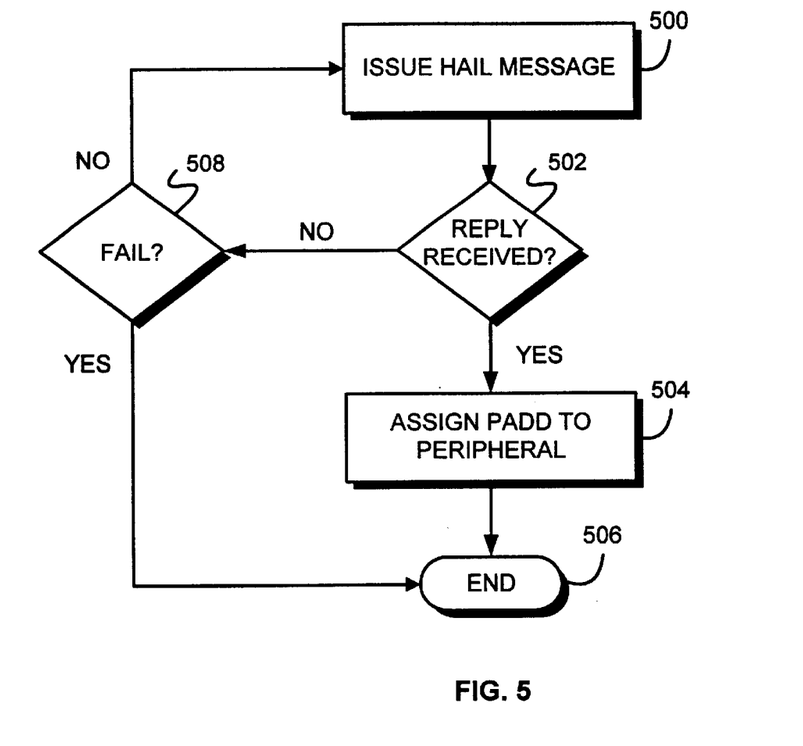
FIG. 5 shows a binding process in accordance with one embodiment of the invention.

Once enumerated, peripheral device 102 should be bound to host 100 before substantive communication between the two may be effected. A binding process performed by host 100 in accordance with one embodiment of the invention is shown in FIG. 5. At some time after enumeration has been completed (see, e.g., FIGS. 3 and 4) host 100 generates a "hail" message indicating it is ready to communicate with wireless peripherals (step 500). In a hail type message, HADD field 202 and data field 208 may be set to include the host's HADD and HostID values respectively.

If a wireless peripheral device responds to the host's hail message (the 'yes' prong of step 502), host 100 transmits a message in which peripheral device 102 is assigned a PADD value that is distinct from any other PADD value assigned by host 102 to any other currently enumerated wireless peripheral device (step 504). On reception of this message by peripheral device 102, bind processing is complete (step 506). Thereafter, host 100 may periodically communicate (e.g., query or poll) peripheral device 102 by transmitting a message whose PADD field 204 corresponds to the value assigned during step 504.

If no wireless peripheral responds to the host's hail message (the 'no' prong of step 502), host 100 determines if the binding process has failed. If host 100 determines the binding process should fail because, for example, no reply is received within a specified period of time (the 'yes' prong of step 508), bind processing terminates at step 506. If host 100 determines the binding process should not fail because, for example, a specified time period between a hail message (see step 500) and a reply message has not been exceeded (the 'no' prong of step 508), bind processing continues at step 500.

In one embodiment, host 100 associates a bind timer with each peripheral device 102. When host 100 receives a response to a post-binding query (e.g., poll) message from wireless peripheral device 102, it can set the associated timer to an initial value. Host 100 may unbind peripheral device 102 if the peripheral's associated bind timer expires before it (host 100) receives the peripheral's polling response. Host 100 may also unbind peripheral device 102 if it receives a message from the peripheral requesting that it be unbound. In a similar fashion, a peripheral that does not receive a host initiated query message within a specified time period may regard itself as unbound. Peripheral device 102 may also regard itself as unbound when it has been power-cycled or reset.

Figure 6:
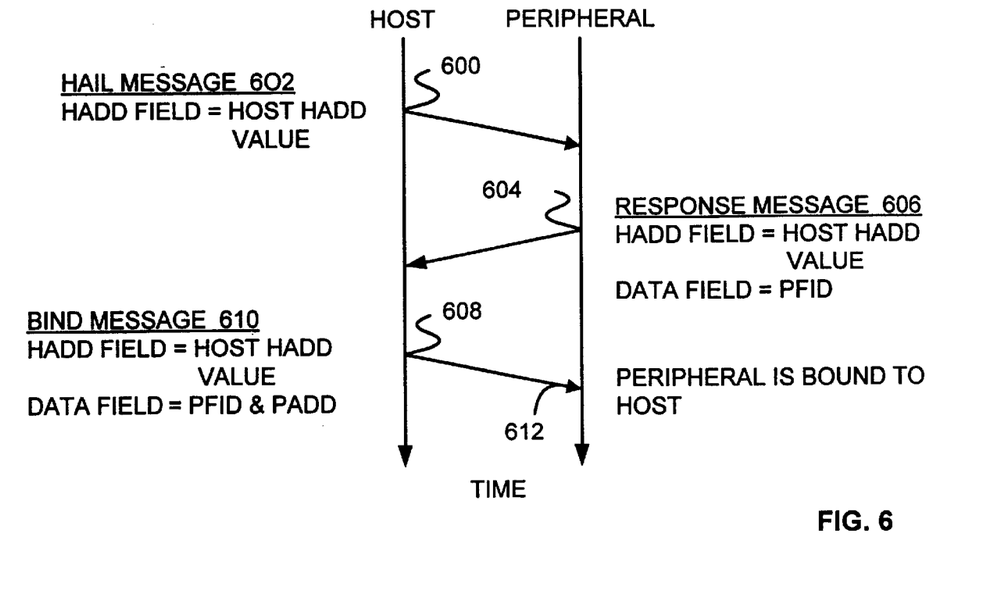
FIG. 6 shows the binding process of FIG. 5 in terms of the messages that may be transferred between a host computer system and a wireless peripheral.

FIG. 6 shows messages that may be transferred between host 100 and peripheral device 102 during the binding process of FIG. 5. At time 600 host 100 transmits hail message 602 whose HADD field 202 is set to the host's HADD value. At subsequent time 604, peripheral device 102 responds by transmitting response message 606 whose data field 608 is set to include its PFID value. At time 608 host 100 transmits bind message 610 whose HADD field 202 is set to its HADD value and whose data field 208 is set to include the peripheral's PFID and host 100 generated PADD values. When peripheral device 102 receives bind message 610 at time 612, peripheral device 102 is said to be bound.

Figure 7:
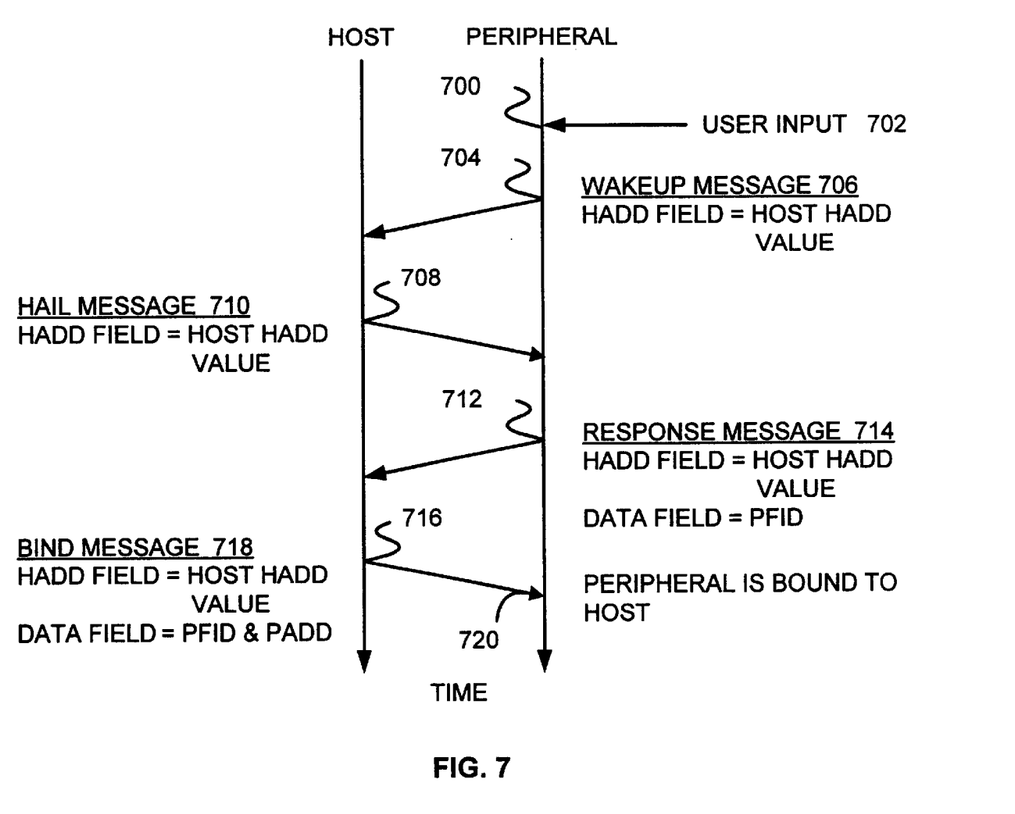
FIG. 7 shows a binding process in accordance with another embodiment of the invention.

Some current computer systems can enter a "sleep" or low power state if no user activity (scheduled or interactive) is detected within a specified period of time. While in a sleep state, computer system 100 may not generate periodic communication (e.g., polling) messages to its bound peripherals 102. This may result in peripheral device 102 becoming unbound. If this occurs, an enumerated peripheral may initiate communication with host 100 to reestablish binding. One embodiment of a rebinding mechanism in accordance with the invention is shown in FIG. 7. Before time 700 it is assumed host 100 has entered a low power state is (e.g., a sleep state) and, as a result, at least one bound peripheral device 102 has become unbound. At time 700 user input 702 is detected by the previously bound and currently unbound peripheral device 102. At time 704 peripheral device 102 transmits wake up message 706 to host 100. At time 708, host 100 responds by generating hail message 710 whose HADD field 202 is set to its HADD value. At time 712, peripheral device 102 replies with message 714 whose data field 208 is set to include its PFID value. Host 100, at time 716, generates bind message 718 whose data field 208 is set to include the peripheral's PFID and PADD) values. When peripheral device 102 receives bind message 718 at time 720, the peripheral device 102 is bound.

A wireless communication mechanism in accordance with the invention uses a HostID value that may be retained by host 100 even after power-cycle and/or reset operations (i.e., is persistent). For example, host 100 could store its HostID value in a nonvolatile memory 114 such as EPROM, EEPROM, a flash device, magnetic disks (fixed, floppy, and removable), other magnetic media such as tape, or optical media. In one embodiment, the HostID is a 16-bit value which is assigned when the host is manufactured. In another embodiment, the HostID may be generated when host 100 is initially set up. In yet another embodiment, the HostID may be generated in a dynamic fashion by host 100. For instance, host 100 may generate a HostID whenever the contents of nonvolatile memory 114 containing its current HostID value is lost.

In those embodiments that dynamically generate a HostID value, the value so generated should be distinct from those used by other hosts (communicating with other wireless peripherals) within a common operating environment. If a conflict between two HostIDs occurs, each host affected may use any convenient conflict resolution scheme to modify their HostID. One illustrative conflict resolution scheme is to have each affected host generate a new HostID and then enumerate and bind its wireless peripherals. Since there are more than 65,000 possible values for a 16-bit HostID, there is a relatively small probability that two hosts operating within the same local area will have the same HostID value. Another factor that may be considered in selecting a HostID value size is the required communication bandwidth (or transmission time) required to transmit it between the host and peripheral, see FIGS. 4, 6, and 7. Generally, larger HostID values (e.g., 32-bits versus 16-bits) imply a lower probability of local conflicts and longer message transmission times (or larger bandwidth), while smaller HostID values imply a higher probability of local conflicts but shorter message transmission times (or lower bandwidth).

In one embodiment in accordance with the invention, host 100 may also retain enumeration data (e.g., peripheral PFIDs) after power-cycle and/or reset operations—during enumeration operations (e.g., see FIGS. 3 and 4) peripheral PFIDs are retained and, when a peripheral is no longer enumerated, its PFID is discarded. Enumeration data may be stored with, or separate from, the host's HostID value. In these embodiments, a host that has been reset need only rebind its wireless peripherals—it may not have to enumerate them. A benefit of these embodiments is that the time between a host reset or power-cycle operation and when a user may begin providing input to the host via a wireless peripheral device is less than if both enumeration and binding operations are required.

Figure 8:
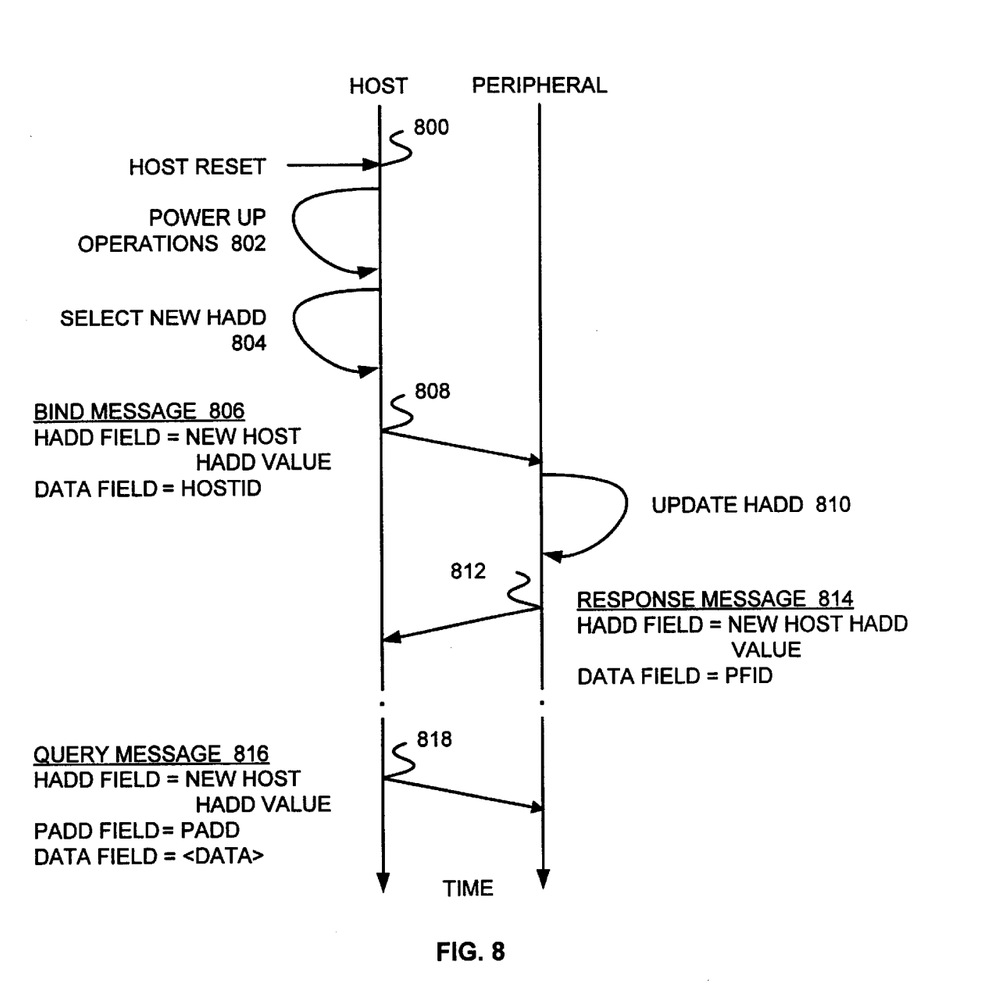
FIG. 8 shows a binding process in accordance with yet another embodiment of the invention.

FIG. 8 illustrates a binding operation following a host 100 reset in which both HostID and enumeration data are retained (for example, stored in nonvolatile memory 114). At time 800 host 100 is reset. During power-up operations 802, host 100 retrieves its HostID value and enumeration data (e.g., enumerated peripheral PFID values) from memory 114. Next, host 100 generates a new HADD value 804 that is distinct from those used by other hosts transmitting within its operating environment (see step 302 in FIG. 3). Once host 100 has determined its HostID and HADD values, it generates "bind" message 806 whose HADD field 202 is set to its newly generated HADD value and whose data field 208 may be set to include its HostID value. Peripheral device 102 may detect that host 100 has changed its HADD value by noting that the HostID value of bind message 806 matches the HostID value of the host it is currently enumerated with, but that the received HADD value (e.g., the host's new HADD value) does not match the HADD value already associated with that HostID. Peripheral device 102 may then remap its HADD information to coincide with its host's new HADD value 810. At time 812 peripheral device 102 may generate response message 814 whose HADD field 202 corresponds to the host's new HADD value and whose data field 208 may be set to include its PFID value. Thereafter, host 100 may issue query (e.g., polling) message 816 at subsequent time 818.

Various changes in the materials, components, circuit elements, as well as in the details of the illustrated operational methods are possible without departing from the scope of the claims. For example, communication channel 104 is not restricted to the transmission and reception of infrared signals. Further, the enumeration and binding mechanisms described herein may be embodied in a single hardware device such as a printed circuit board comprising discrete logic, integrated circuits, or specially designed application specific integrated circuits (ASIC). In addition, method steps in accordance with any one or more of FIGS. 3 through 8 may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

What is claimed is:

1. A method to detect a wireless peripheral device by a host computer system comprising:
   retrieving a persistent host identifier and generating a host address;
   transmitting a hail message to the wireless peripheral device, the hail message including the host identifier and host address; and
   receiving a response message from the wireless peripheral device.

2. The method of claim 1, wherein transmitting a hail message comprises generating an infrared signal representative of the hail message.

3. The method of claim 1, further comprising:
   retrieving a wireless peripheral device identifier; and
   including the retrieved wireless peripheral device identifier in the response message.

4. The method of claim 3, wherein retrieving comprises reading a persistent value representative of the wireless peripheral device identifier.

5. The method of claim 1, further comprising:
   generating a host address prior to transmitting the hail message; and
   including the generated host address in the hail message.

6. The method of claim 5, wherein generating a host address comprises selecting a host address that is not being used by a second host computer system transmitting a signal to another wireless peripheral device within a signal detection range of the host computer system.

7. The method of claim 1, wherein the method is performed automatically following a powering on or resetting of the host computer system.

8. A program storage device, readable by a host computer system, comprising:
   instructions stored thereon for causing the computer system to:
   retrieve a persistent host identifier and generate a host address;
   transmit a hail message to the wireless peripheral device, the hail message including the host identifier and host address; and
   receive a response message from the wireless peripheral device.

9. The program storage device of claim 8, wherein the instructions to transmit a hail message comprise instructions to generate an infrared signal representative of the hail message.

10. The program storage device of claim 8, further comprising instructions to:
    retrieve a wireless peripheral device identifier; and
    include the retrieved wireless peripheral device identifier in the response message.

11. The program storage device of claim 10, wherein the instructions to retrieve a wireless peripheral device identifier comprise instructions to read a persistent value representative of the wireless peripheral device identifier.

12. The program storage device of claim 8, further comprising instructions to:
    generate a host address prior to performing the instructions to transmit the hail message; and
    include the generated host address in the hail message.

13. The program storage device of claim 12, wherein the instructions to generate a host address comprise instructions to select a host address that is not being used by a second host computer system transmitting a signal to another wireless peripheral device within a signal detection range of the host computer system.

14. The program storage device of claim 8, wherein the instructions are encoded to execute following a powering on or resetting of the host computer system.

15. The program storage device of claim 8, wherein the wireless peripheral device comprises a pointer device.

16. A method to detect and bind a wireless peripheral device by a host computer system comprising:
    generating a host address;
    retrieving a persistent host identifier;
    retrieving a wireless peripheral device identifier;
    transmitting a first message to the wireless peripheral device, the first message including the host identifier and the host address;
    receiving a response message from the wireless peripheral device; and
    transmitting a second message to the wireless peripheral device, the second message including a peripheral device address.

17. The method of claim 16, wherein generating a host address comprises selecting a host address that is not being used by a second host computer system communicating with a second wireless peripheral within a signal detection range of the host computer system.

18. The method of claim 16, wherein transmitting a first message comprises generating an infrared signal representative of the first message.

19. The method of claim 16, wherein the method is automatically executed following a powering on or resetting of the host computer system.

20. A program storage device, readable by a computer system, comprising:

instructions stored thereon for causing the computer system to:
   generate a host address;
   retrieve a persistent host identifier;
   retrieve a wireless peripheral device identifier;
   transmit a first message to the wireless peripheral device, the first message including the host identifier and the host address;
   receive a response message from the wireless peripheral device; and
   transmit a second message to the wireless peripheral device, the second message including a peripheral device address.

21. The program storage device of claim 20, wherein the instructions to generate a host address comprise instructions to select a host address that is not being used by a second computer system to communicate with a second wireless peripheral within a signal detection range of the computer system.

22. The program storage device of claim 20, wherein the instructions to transmit a first message comprise instructions to generate an infrared signal representative of the first message.

23. The program storage device of claim 20, wherein the wireless peripheral device comprises a keyboard device.

24. A device comprising:
   a generator to generate a host address;
   a persistent storage device;
   a circuit, operatively coupled to the persistent storage device, to retrieve a persistent host identifier and a wireless peripheral device identifier;
   a first transmitter, operatively coupled to the generator and the circuit, to transmit a first message, the first message including the host address and the host identifier;
   a receiver, operatively coupled to the circuit, to receive a response message; and
   a second transmitter, operatively coupled to the generator and the circuit, to transmit a second message, the second message including a peripheral device address.

25. The device of claim 24, wherein the persistent storage device comprises a nonvolatile memory.

26. The device of claim 24, wherein the device is automatically activated following a powering on or resetting of a computer system operatively coupled to the device.

* * * * *